Dec. 9, 1941.  W. H. MOSS  2,265,303
MANUFACTURE OF PLASTIC COMPOSITIONS
Filed March 24, 1938
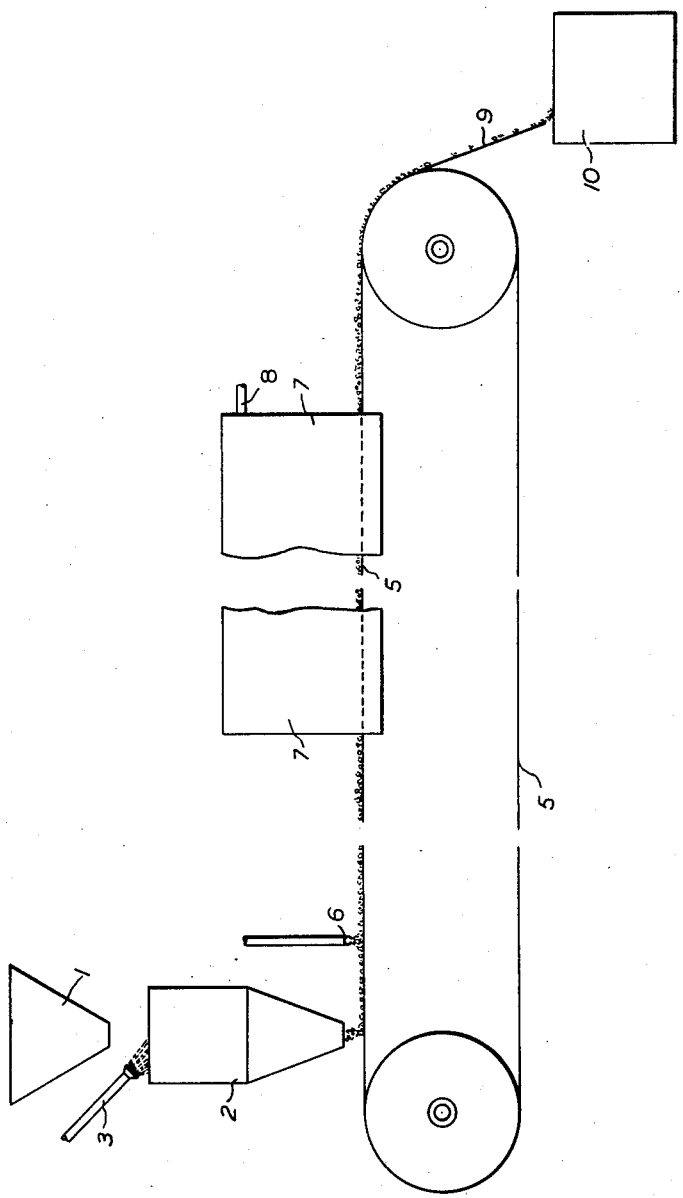
Inventor:
WILLIAM H. MOSS
by
Attorneys Patented Dec. 9, 1941

2,265,303

UNITED STATES PATENT OFFICE 2,265,303

MANUFACTURE OF PLASTIC COMPOSITIONS

William Henry Moss, London, England, assignor to Celanese Corporation of America, a corporation of Delaware Application March 24, 1938, Serial No. 197,864

7 Claims. (Cl. 18—51)

This invention relates to improvements in the treatment of plasticisable compounds and is more particularly concerned with a new method for the production of compositions containing plasticisable compounds and plasticisers. This application is a continuation-in-part of application S. No. 143,940 filed May 21, 1937.

According to the present invention compositions containing plasticisers and plasticisable compounds, for example cellulose derivatives, are produced by distributing a plasticiser substantially uniformly over the surface of particles of a plasticisable compound which are moistened with a non-solvent for the compound, and the non-solvent is then removed from the mass by evaporation in the absence of any mechanical working. In this process the physical state of the plasticisable compound is substantially unchanged after the distribution of the plasticiser and removal of the non-solvent, and it remains, for example, in its original flaky or fibrous condition. Further, the bulk density of the mixture of plasticisable compound and plasticiser, i. e. the weight of unit volume of the mixture, is, in general, not substantially greater at this stage than the bulk density of the original plasticisable compound. For example, if the bulk density of the flaky or fibrous cellulose acetate is about 3–4 grams per cubic inch, then that of a mixture of cellulose acetate and plasticiser prepared as above is about 4–5 grams per cubic inch, whereas that of the plasticised cellulose acetate masses usually produced is of the order of 12 grams per cubic inch.

The non-solvent, which is preferably water, is employed in an amount just sufficient to moisten the cellulose derivative or other plasticisable compound, and may be present for example in a proportion of 50–150%, and especially 100–130%, based on the weight of the plasticisable compound. Examples of organic non-solvents which may be employed are isopropyl and other ethers, benzene, toluene and other hydrocarbons and ethyl alcohol and other alcohols.

In carrying out the process of the present invention the desired amount of water or other non-solvent may, for example, be mixed with cellulose acetate or other plasticisable compound in a suitable mixing apparatus such as a Werner-pfleiderer mixer, and a liquid plasticiser then run in slowly in the form of a thin stream or coarse spray on to the compound while it is being mixed. If a totally enclosed mixer is used, the plasticiser may be introduced in the form of a very fine spray without substantial loss of plasticiser. The mixing may be continued for a short time, say for 5 to 10 minutes, after the addition of the plasticiser, to ensure that the plasticiser is distributed uniformly over the surface of the moist particles. It is, however, essential according to the present invention that the actual application of the plasticiser to the surface of the plasticisable compound shall be effected substantially uniformly so that no local excess of plasticiser occurs at any stage. Any mixing effected is essentially for the purpose of exposing fresh surfaces of plasticisable compound to the plasticiser being applied, and not in an attempt to secure uniform distribution by mixing together portions of plasticisable compound free from plasticiser with portions containing an excess thereof.

Instead of distributing the plasticiser over the plasticisable compound in a mixer as is described above, the moist plasticisable compound may be spread out in a thin layer, for example about ¼" in thickness, and the plasticiser may be sprayed on to it. During the spraying the plasticisable compound may be turned so as to assist in the uniform distribution of the plasticiser. The process can be carried out continuously by spreading the plasticisable compound in a thin layer on to a moving belt and spraying the plasticiser on to the layer of compound as it travels past a fixed spray. The belt carrying the mixture of plasticisable compound and plasticiser may be passed through a chamber in which the non-solvent is evaporated and the mixture may subsequently be removed from the belt and subjected to any further treatment which may be required. Thus, where it is desired to obtain the product in the form of a powder, the plasticised product may be ground, for example in a mill of the swinging hammer type.

Solid plasticisers may be distributed in cellulose acetate or other plasticisable compound by the process of the present invention. Thus, they may be dissolved in a highly volatile solvent, for example ether, and sprayed on to the moist cellulose acetate or other plasticisable compound in a mixer, the volatile solvent being allowed to evaporate during the spraying. The process is, however, particularly suitable for the incorporation of liquid plasticisers.

Pigments, dyes or filling materials may be incorporated at any suitable stage of the operation. For example they may be incorporated with the cellulose acetate or other plasticisable compound before damping with non-solvent.

The accompanying drawing diagrammatically illustrates a method of carrying out the invention. According to this method, cellulose acetate or other plasticisable compound in the form of granules is introduced from a hopper 1 into a mixer 2 into which water or other non-solvent may be sprayed from a lead 3. After the plasticisable compound has been mixed with the non-solvent, it may be delivered from the mixer on to a travelling continuous metal band 5. The band carries the materials as a thin layer beneath a spray 6, supplying liquid plasticiser, and then through a heating chamber 7 of suitable dimensions to permit evaporation of non-solvent. The atmosphere of the heating chamber may be drawn off through a line 8 and non-solvent recovered if desired. A scraping device 9 serves to separate the residual plasticised material from the band and to lead it into a suitable receptacle 10 when it is ready for use, for example, as a molding composition.

A suitable formula for working up according to the present invention is as follows:

|  | Parts |
|---|---|
| Cellulose acetate, about 40–50 mesh | 100 |
| Triacetin | 38 |
| China clay | 10 |
| Chrome yellow | 18 |
| Water | 125 | all parts being by weight.

The china clay and chrome yellow may be incorporated with the cellulose acetate before the moistening operation, and the triacetin is distributed uniformly over the moist cellulose acetate particles by one of the above methods.

By this process the disadvantages associated with the direct mixing of a plasticiser with a plasticisable compound, showing themselves more particularly in uneven distribution of the plasticiser and the formation of numerous soft lumps containing excess plasticiser and a powdery portion lacking its proper proportion of plasticiser, are avoided. Furthermore, the disadvantages attendant upon the introduction of the plasticiser in presence of a large amount of water or other diluent are likewise avoided. According to this latter known method the plasticisable compound is brought into the form of a slurry or suspension in a non-solvent liquid, and the plasticiser either dissolved or suspended in this liquid. The large amount of liquid used in this method slows up the plasticising of the compound to an undesirable extent and, moreover, involves expense in its removal. In the method according to the present invention there is very little non-solvent to be removed and, moreover, an efficient distribution of the plasticiser may be obtained, the small amount of non-solvent slowing up the action of the plasticiser upon the plasticisable compound and hence preventing uneven distribution of the plasticiser and formation of over-softened lumps.

While the mixture of plasticisable compound and plasticiser obtained according to the process of the present invention may be employed, for example for moulding or other purposes, in any suitable form, for example in the form of a powder as described above, it has been found that particular advantages are obtained if a mixture of the plasticisable compound and a plasticiser therefor, which is moist with a non-solvent for the plasticisable compound, is converted into a powdery or granular form by extruding it through an extrusion machine in rod-like form, and if necessary disintegrating the extruded material.

The extrusion machine is preferably worm fed and provided with cutter blades close to the extrusion plate, for example an apparatus of the mincing machine type. The orifices in the extrusion plate need not necessarily be round. They may, for example, be of such a shape that the rod-like products have the form of laminae. The proportion of non-solvent may be 50–150%, and particularly 100–130%, of the weight of the plasticisable compound. The process has been found to be especially valuable when the plasticisable compound is a cellulose derivative or a synthetic resin.

By suitable adjustment of the conditions, particularly the proportion of non-solvent and the temperature of the mixture in the extrusion machine, the material extruded from the machine may be obtained in the form of small rods, e. g. having a diameter of about ⅛ of an inch, which break up into granules under their own weight. The granules may then be dried, for example on steam heated trays. The granules may be further broken up after drying. This breaking up of rods into granules is apparently assisted by the use of the cutter blades close to and preferably on the feed side of the extrusion plate of the extrusion machine.

The form of the granules is dependent upon the shape and size of the orifices of the extrusion plate, and may, for example, be cylindrical or laminar. In general it is found that this granular form is the form most suitable for use in moulding operations.

In order to obtain the extruded material in granular form the temperature of the mixture in the machine should not be allowed to rise above about 35° C. Thus if there is any substantial tendency to heating during the extrusion process, it is desirable to employ a machine fitted with suitable cooling means, for example a water jacket.

The optimum proportion of non-solvent to plasticisable compound for the production of the granular material depends to some extent on the particular compound and non-solvent and also on the physical condition of the compound, e. g. its state of sub-division. The proportion should not be so great that granules formed by the extrusion machine are so soft that they do not hold their shape or so small that excessive power is required for operating the machine. In general the best proportion is of the order of 100–130% of the weight of plasticisable compound. The non-solvent preferably employed is water, but organic non-solvents such as are referred to above may also be used.

Granular material obtained as described above is very suitable indeed for moulding, and especially for injection moulding, since in this method a constant rate of feed to the injection cylinder is of great importance and is much more easily achieved using granules than with a powder. On the other hand the mixture may if desired be obtained in the form of continuous rods or the like, which may be subsequently ground, e. g. by carrying out the extrusion at higher temperatures, e. g. 50–70° C. or more so that the non-solvent evaporates from the materials as they are extruded.

Pigments, dyes or filling materials may be incorporated at any suitable stage of the operation. For example, they may be incorporated with cellulose acetate or other plasticisable compound before damping with a non-solvent, or they may be added in the extrusion apparatus, though in this case it may be desirable to put the material through the extrusion apparatus a second time.

While the invention has been described more particularly with reference to cellulose acetate it may be applied to the working up into mouldable form of other plasticisable compounds, particularly cellulose derivatives, including cellulose formate, cellulose propionate, cellulose butyrate, cellulose nitroacetate, ethyl cellulose acetate and cellulose nitrate, and methyl, ethyl and benzyl celluloses, and the various plasticisable synthetic resins, for instance polyvinyl acetate, polyvinyl chloride, polystyrene, diphenylol propane formaldehyde resin, and other synthetic resins. As already indicated, the method of introducing the plasticiser in the presence of a limited quantity of water or other non-solvent is particularly suitable for incorporation of liquid plasticisers, but may be employed with solid plasticisers. Examples of suitable plasticisers include triacetin and dibutyl phthalate already mentioned, dimethyl, diethyl and diamyl phthalates, tartrates, for example dibutyl tartrate, sulphonamides, for example the isomeric monomethylated xylene sulphonamides, paratoluene sulphonamide, ethyl paratoluene sulphonamide and the like, and triaryl and trialkyl phosphates, e. g. tricresyl phosphate, triethyl phosphate and trichlorethyl phosphate.

Having described my invention, what I desire to secure by Letters Patent is:

1. Process for the treatment of plasticisable compounds, which comprises distributing a plasticiser substantially uniformly over the surface of particles of a plasticisable compound which are moistened with a non-solvent for the compound and then removing non-solvent from the mass by evaporation, such removal being effected in the absence of any mechanical working of the mass and the original physical state of the compound being substantially unchanged.

2. Process for the treatment of plasticisable compounds, which comprises distributing a liquid plasticiser substantially uniformly over the surface of particles of a plasticisable compound which are moistened with a non-solvent for the compound and then removing non-solvent from the mass by evaporation, such removal being effected in the absence of any mechanical working of the mass and the original physical state of the compound being substantially unchanged.

3. Process for the treatment of plasticisable compounds, which comprises distributing a plasticiser substantially uniformly over the surface of particles of an organic derivative of cellulose which are moistened with a non-solvent for the cellulose derivative, and then removing non-solvent from the mass by evaporation, such removal being effected in the absence of any mechanical working of the mass and the original physical state of the cellulose derivative being substantially unchanged.

4. Process for the treatment of plasticisable compounds, which comprises distributing a plasticiser substantially uniformly over the surface of particles of an organic derivative of cellulose which are moistened with a proportion of 50 to 150%, based on the weight of the cellulose derivative, of non-solvent for the cellulose derivative and then removing non-solvent from the mass by evaporation, such removal being effected in the absence of any mechanical working of the mass and the original physical state of the cellulose derivative being substantially unchanged.

5. Process for the treatment of plasticisable compounds, which comprises distributing a plasticiser substantially uniformly over the surface of particles of cellulose acetate which are moistened with a proportion of 100 to 130%, based on the weight of the cellulose acetate, of water, and then removing water from the mass by evaporation, such removal being effected in the absence of any mechanical working of the mass and the original physical state of the cellulose acetate being substantially unchanged.

6. Process for the treatment of plasticisable compounds, which comprises distributing a plasticiser substantially uniformly over the surface of particles of cellulose acetate which are moistened with a non-solvent for the cellulose acetate, and then removing non-solvent from the mass by evaporation, such removal being effected in the absence of any mechanical working of the mass and the original physical state of the cellulose acetate being substantially unchanged, the final mixture of cellulose acetate and plasticiser having a bulk density of about 4 to 5 grams per cubic inch.

7. Process for the treatment of plasticisable compounds, which comprises distributing a liquid plasticiser substantially uniformly over the surface of particles of cellulose acetate which are moistened with a non-solvent for the cellulose acetate, and then removing non-solvent from the mass by evaporation, such removal being effected in the absence of any mechanical working of the mass and the original physical state of the cellulose acetate being substantially unchanged, the final mixture of cellulose acetate and liquid plasticiser having a bulk density of about 4 to 5 grams per cubic inch.

WILLIAM HENRY MOSS.